United States Patent [19]
Rusconi

[11] Patent Number: 6,149,005
[45] Date of Patent: Nov. 21, 2000

[54] CONTAINER FOR TRANSPORTING FOODS

[76] Inventor: Danilo Rusconi, C.F.di Cambiano, 9-Moncalieri (TO), Italy

[21] Appl. No.: 09/294,646

[22] Filed: Apr. 19, 1999

[30] Foreign Application Priority Data

Jun. 19, 1998 [IT] Italy .................. T0980113 U

[51] Int. Cl.⁷ .......................... A45C 11/20; B65D 25/04; B65D 25/28
[52] U.S. Cl. ..................... 206/545; 206/549; 220/768; 220/775; 220/915.2; 426/115; 426/120; 62/457.5
[58] Field of Search ................... 206/594–596, 206/549, 564, 541, 548, 590, 591; 426/112, 114, 115, 119, 120; 220/915.1, 915.2, 758, 768, 769, 770, 775; 62/457.5

[56] References Cited

U.S. PATENT DOCUMENTS

| | | | |
|---|---|---|---|
| 1,716,367 | 6/1929 | Clayton | 220/915.1 X |
| 2,096,825 | 10/1937 | Roman | 426/114 |
| 2,465,910 | 3/1949 | Mills | 206/544 |
| 2,645,332 | 7/1953 | Martin et al. | 206/545 |
| 2,885,107 | 5/1959 | Bliss | 220/775 X |
| 3,618,759 | 11/1971 | Kolasinski et al. | 206/509 X |
| 3,799,386 | 3/1974 | Madalin et al. | 206/564 |
| 4,344,300 | 8/1982 | Taylor | 62/457.5 |
| 4,360,105 | 11/1982 | Williams | 206/544 |
| 4,815,591 | 3/1989 | Tivy | 220/768 X |
| 4,932,527 | 6/1990 | Hayes | 206/541 X |
| 5,016,756 | 5/1991 | Wischhusen et al. | 206/545 |
| 5,497,883 | 3/1996 | Monetti | 206/549 X |
| 5,501,338 | 3/1996 | Preston | 206/545 |
| 5,595,302 | 1/1997 | Maydwell et al. | 206/541 |
| 5,709,307 | 1/1998 | Rosado et al. | 206/548 |

*Primary Examiner*—Bryon P. Gehman
*Attorney, Agent, or Firm*—Synnestvedt & Lechner LLP

[57] ABSTRACT

Container for transporting foods, parallelepiped, formed by an hollow body (1) and a cover (3), in plastic material, in which interior it is provided a plurality of spaces (5) and/or wells (9, 11, 13, 15) for transporting foods, drinks and cutlery. The container is provided with suitable means for the application of a closing strap (29) and with cavities (31) for taking and lifting the cover (3).

15 Claims, 2 Drawing Sheets

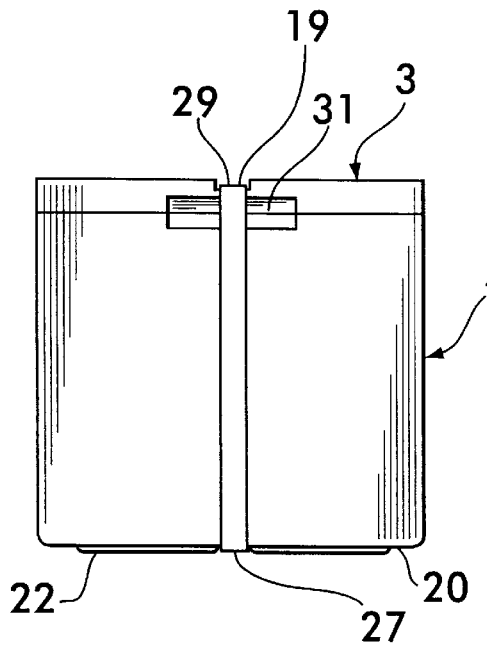
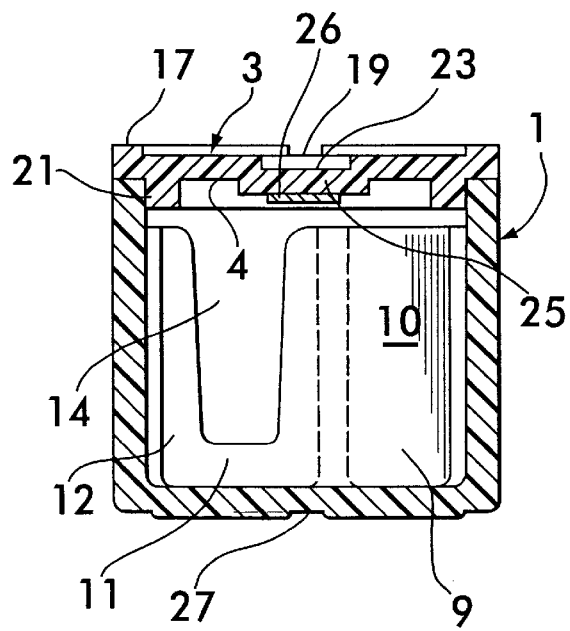
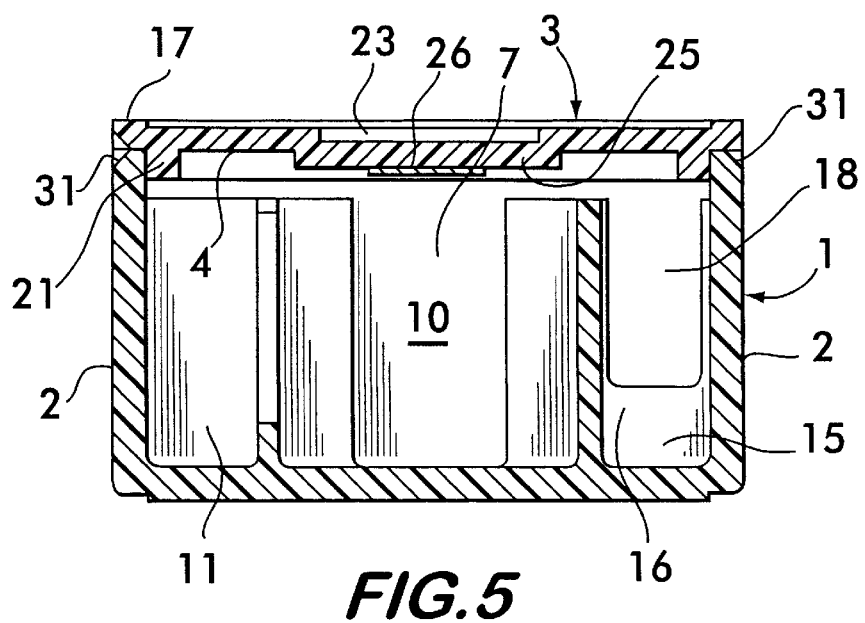

CONTAINER FOR TRANSPORTING FOODS

FIELD OF THE INVENTION

The present invention relates to a container for transporting foods and, more particularly, to a plastic container in which a day's worth of prepared food is protected and transported to a consumer.

BACKGROUND OF THE INVENTION

Food services are increasingly providing pre-cooked foods to consumers at locations such as community centers, schools and retirement facilities rather than prepare the foods at the particular location. The pre-cooked food is packaged and transported to the consumers' location and heated, if necessary, to effect the meal service. The use of pre-cooked and packaged foods provides increased safety with regard to the cleanliness of the environment in which the food is prepared.

SUMMARY OF THE INVENTION

The purpose of the present invention is to provide a suitable container for transporting pre-cooked foods sufficient for a day's scheduled meals. The container provides a place for the food and does not suffer the drawbacks of containers presently in use.

The container for transporting foods according to the invention is a parallelepiped formed by a hollow body and a cover, preferably made of plastic material. The container has an interior in which a plurality of spaces and wells are provided for holding food, drinks and cutlery. The container also has a closing strap and cavities facilitating lifting and removal of the cover.

BRIEF DESCRIPTION OF THE DRAWINGS

FIG. 3 is an end elevational view of the container shown in FIG. 1;

FIG. 4 is a cross-sectional view taken along line IV—IV of FIG. 1; and

FIG. 5 is a cross-sectional view taken along line V—V of FIG. 1.

DETAILED DESCRIPTION OF THE PREFERRED EMBODIMENT

Figure 1:
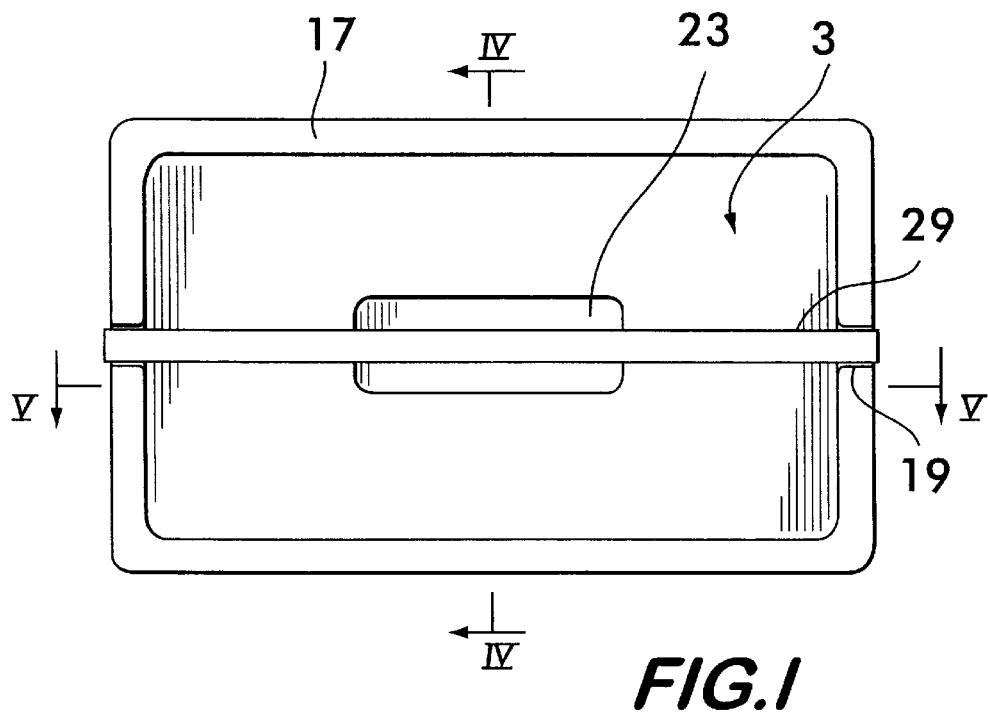
FIG. 1 is a plan view of the container according to the invention with the cover shown in the closed position.
Figure 2:
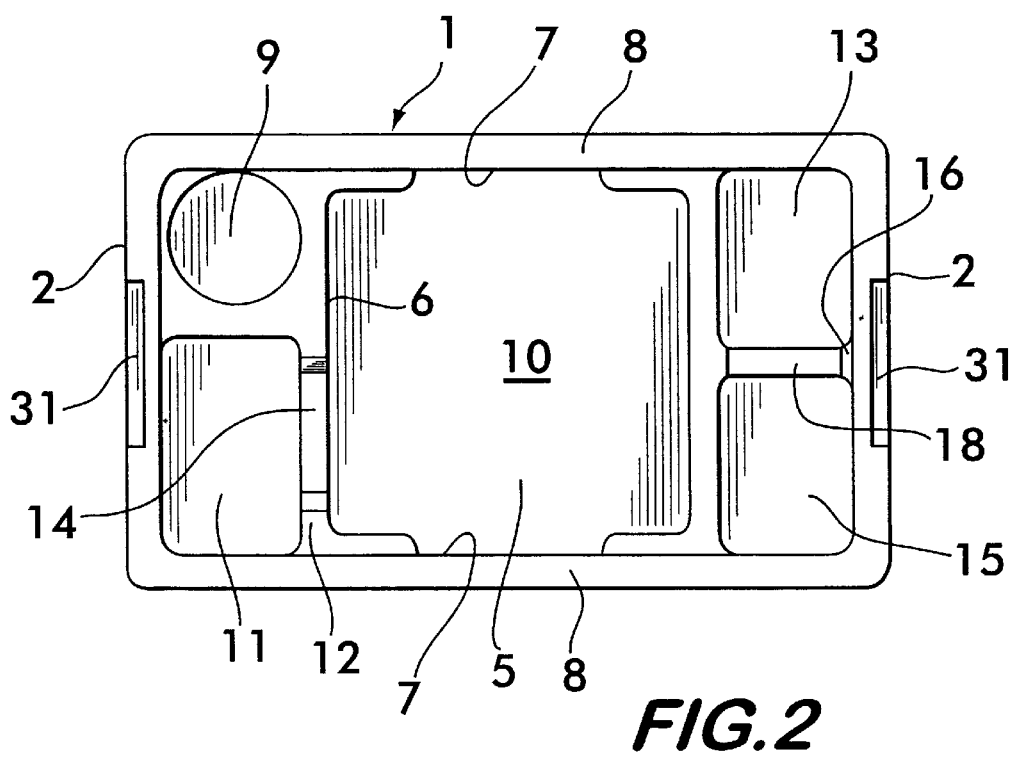
FIG. 2 is a plan view the container shown in FIG. 1 in an open configuration with the cover removed.

As shown in FIGS. 1, 2 and 3, the container according to the invention is a hollow parallelepiped body 1 provided with a cover 3. Body 1 has a bottom 20, a pair of short side walls 2 and longer side walls 8 which define an inside region 10. Preferably, the container is made of a suitable plastic material which is washable and reusable several times.

As seen in FIG. 2, a central space 5 is provided for containing a stack of dishes (not shown) which provide six courses of meals, for example, three lunch courses and three dinner courses. The dishes are preferably single use dishes, and the food is packed on each dish and heat sealed with suitable plastic material. Central space 5 preferably has a rectangular perimeter 6 which is matched to the shape of the dishes, also preferably rectangular. Two enlargements 7 are positioned on opposite sides of the central space, the enlargements being positioned between the dishes and the longer side walls 8 of the parallelepiped body 1, allowing the dishes to be removed from the container.

Two wells 9 and 11 are positioned along the side of the central space 5, as shown in FIG. 2. Well 9 is preferably circular and is designed to hold a bottle of water, while well 11 is preferably rectangular in shape and designed to hold a paper bag containing wine, such a the brand "Tavernello". A side wall 12 divides the rectangular well 11 from the central space 5 and is provided with a trapezoidal opening 14 (see FIG. 4) to facilitate removal of the paper bag holding the wine.

Two additional wells 13 and 15 are provided on the opposite side of central space 5. Preferably, wells 13 and 15 are rectangular in shape, one well being intended to hold bread and cutlery, the other for holding a serving of fruit. Wells 13 and 15 are separated by a side wall 16 having a "U" shaped opening 18 (see FIG. 5) facilitating removal of the bread and fruit from the wells.

As shown in FIG. 4, cover 3 has an upper perimetrical edge 17 which is interrupted on each of the shorter sides by two respective cavities 19 (only one being shown in FIG. 4). As seen in FIG. 3, cavities 19 are aligned with an external groove 27 which runs along the center line of the bottom 20 of the body 1. The groove accepts a closing strap 29, and the upper part of the strap passes through cavities 19 on the cover 3. The container bottom has a raised portion 22 which extends outwardly and is sized and shaped to interfit with and interengage the perimetrical edge 17 on the cover 3. This allows several containers to be superimposed one above another in a stack for convenient storage and transportation.

A prominence 25 (see FIGS. 4 and 5) is provided on the lower surface of cover 3. The prominence is preferably used to support a thermal plate 26, which is placed on the inside of the container between the cover 3 and the food to maintain the correct temperature inside the container.

FIGS. 4 and 5 also show an inferior edge 21 which extends from the lower surface 4 of cover 3, the edge 21 allowing insertion of the cover 3 into the body 1 facilitating its closing. The upper surface of the cover has a rectangular hollow 23 (see FIG. 1) which allows the strap 29 to act as a handle for lifting and carrying the container.

FIGS. 2 and 3 show a pair of cavities 31 which are provided on each of the shorter sides 2 of the body 1. Preferably, the cavities are positioned in alignment with the center line of the shorter sides. Two cavities are positioned on the cover 3 and the other two are positioned on the side walls of the body 1 beneath the cavities on the cover. The cavities facilitate removing the cover from the body.

What is claimed is:

1. A container for transporting food, drink and cutlery, said container comprising:

a hollow parallelepiped body defining an inside region having a plurality of side walls dividing said inside region into a plurality of spaces and wells, said plurality of spaces comprising a central space having a substantially rectangular perimeter, said perimeter having a pair of oppositely arranged enlargements, said plurality of wells comprising:

a first well positioned adjacent to said central space, said first well having a circular perimeter;

a second well positioned adjacent to said first well, said second well having a rectangular perimeter;

a third well positioned adjacent to said central space opposite to said first and second wells;

a fourth well positioned adjacent to said third well and opposite to said first and second wells;

one of said side walls being positioned between said second well and said central space and having an opening therethrough and another of said side walls being positioned between said third and fourth wells and having an opening therethrough;

a cover interengagable with said body overlying and enclosing said inside region, said cover having an upper surface;

a closing strap extending around said container and across said upper surface of said cover for securing said cover to said body, said cover having a cavity positioned on said upper surface beneath said closing strap, said cavity being sized to provide clearance for the fingers of a person manually grasping the closing strap for lifting and carrying said container when said container is closed by said cover.

2. A container according to claim 1, further comprising a first pair of cavities oppositely arranged on the periphery of said cover in spaced relation to said upper surface, and a second pair of cavities arranged on opposite sides of said body underlying said first pair, said first and second pairs of cavities being sized to permit manual grasping of said cover for removal from said body.

3. A container according to claim 1, wherein said body has a bottom having a raised portion extending outwardly therefrom, said raised portion being sized and shaped to interfit with and interengage said perimetrical edge extending from said upper surface of said cover, said container being stackable with a first similar container positioned above said container and a second similar container positioned beneath said container, said raised portion extending from said container bottom and being interengagable with a perimetrical edge extending from the cover of said second similar container and said perimetrical edge extending from said cover of said container being interengagable with a raised portion extending from the bottom of said first similar container.

4. A container according to claim 1, further comprising a lower surface positioned on said cover opposite to said upper surface, a prominence extending outwardly from said lower surface, a thermal plate being mounted on said prominence, said thermal plate being positioned within said inside region of said body when said cover is engaged therewith and maintaining said inside region at a predetermined temperature.

5. A container according to claim 1, wherein said body and said cover are made of a plastic material which is washable and reusable.

6. A container according to claim 1, wherein said opening in said first side wall has a trapezoidal shape.

7. A container according to claim 1, wherein said opening in said second side wall has a U-shape.

8. A container for transporting food, drink and cutlery, said container comprising:

a hollow parallelepiped body defining an inside region having a plurality of side walls dividing said inside region into a plurality of spaces and wells;

a cover interengagable with said body overlying and enclosing said inside region, said cover having a substantially flat upper surface and a raised perimetrical edge extending substantially around its periphery, said perimetrical edge being interrupted by a pair of cavities positioned on opposite sides of said cover, said cover further having an external groove extending across said upper surface between said cavities, said cavities and said groove being positioned and sized to accept said closing strap when said cover is interengaged with said body, said strap being substantially flush with said upper surface, and said cover having a lower surface having a lower edge projection extending outwardly therefrom in spaced relation to the periphery of said cover, said lower edge projection interfitting within said inside region of said body to secure said cover thereto; and a closing strap extending around said container and across said upper surface of said cover for securing said cover to said body, said cover having a cavity positioned on said upper surface beneath said closing strap, said cavity being sized to provide clearance for the fingers of a person manually grasping the closing strip for lifting and carrying said container when said container is closed by said cover.

9. A container according to claim 8, further comprising a first pair of cavities oppositely arranged on the periphery of said cover in spaced relation to said upper surface, and a second pair of cavities arranged on opposite sides of said body underlying said first pair, said first and second pairs of cavities being sized to permit manual grasping of said cover for removal from said body.

10. A container according to claim 8, wherein said body has a bottom having a raised portion extending outwardly therefrom, said raised portion being sized and shaped to interfit with and interengage said perimetrical edge extending from said upper surface of said cover, said container being stackable with a first similar container positioned above said container and a second similar container positioned beneath said container, said raised portion extending from said container bottom and being interengagable with a perimetrical edge extending from the cover of said second similar container and said perimetrical edge extending from said cover of said container and being interengagable with a raised portion extending from the bottom of said first similar container.

11. A container according to claim 8, further comprising:

a lower surface positioned on said cover opposite to said upper surface;

a prominence extending outwardly from said lower surface; and a thermal plate being mounted on said prominence, said thermal plate being positioned within said inside region of said body when said cover is engaged therewith and maintaining said inside region at a predetermined temperature.

12. A container according to claim 8, wherein said body and said cover are made of a plastic material which is washable and reusable.

13. A container according to claim 8, wherein said opening in said first side wall has a trapezoidal shape.

14. A container according to claim 8, wherein said opening in said second side wall has a U-shape.

15. A container for transporting food, drink and cutlery, said container comprising:

a hollow parallelepiped body defining an inside region having a plurality of side walls dividing said inside region into a plurality of spaces and wells; and a cover interengagable with said body overlying and enclosing said inside region, said cover having a substantially flat upper surface and a raised perimetrical edge extending substantially around its periphery, said perimetrical edge being interrupted by a pair of cavities positioned on opposite sides of said cover, said cover further having an external groove extending across said upper surface between said cavities, said cavities and said groove being positioned and sized to accept said closing strap when said cover is interengaged with said body, said strap being substantially flush with said upper surface, and said cover having a lower surface having a lower edge projection extending outwardly therefrom in spaced relation to the periphery of said cover, said lower edge projection interfitting within said inside region of said body to secure said cover thereto.

* * * * *